(12) United States Patent
Marston et al.

(10) Patent No.: US 8,733,027 B1
(45) Date of Patent: *May 27, 2014

(54) METHOD AND APPARATUS FOR ATTACHING A SOLAR PANEL TO A ROOF

(75) Inventors: Carrol Marston, Brooklyn, CT (US); Martin Taylor, Terryville, CT (US); Tamas Kovaks, Bristol, CT (US)

(73) Assignee: Innovative Medical Products Inc., Plainville, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,562

(22) Filed: Apr. 30, 2012

Related U.S. Application Data

(63) Continuation-in-part of application No. 12/590,321, filed on Nov. 6, 2009, now abandoned.

(51) Int. Cl.
*E04D 13/00* (2006.01)

(52) U.S. Cl.
USPC .............. 52/24; 52/588.1; 52/173.3; 52/460; D8/394; 248/536; 248/228.5; 248/231.61; 24/525

(58) Field of Classification Search
USPC ............ 52/24, 25, 26, 27, 588.1, 393, 171.1, 52/173.3, 460; 269/137; 24/525, 569; 248/536, 228.2, 228.5, 231.61; 182/45; D8/394

See application file for complete search history.

(56) References Cited

U.S. PATENT DOCUMENTS

| | | | |
|---|---|---|---|
| 5,352,078 A * | 10/1994 | Nasu | 411/337 |
| 6,360,491 B1 * | 3/2002 | Ullman | 52/22 |
| 7,260,918 B2 | 8/2007 | Liebendorfer | |
| 7,386,922 B1 | 6/2008 | Taylor | |
| 7,434,362 B2 | 10/2008 | Liebendorfer | |
| 7,758,011 B2 | 7/2010 | Haddock | |
| 7,766,292 B2 * | 8/2010 | Liebendorfer | 248/237 |
| 8,128,044 B2 * | 3/2012 | Liebendorfer | 248/237 |
| 2003/0101662 A1 * | 6/2003 | Ullman | 52/27 |
| 2003/0177706 A1 * | 9/2003 | Ullman | 52/3 |
| 2010/0276558 A1 * | 11/2010 | Faust et al. | 248/222.14 |

* cited by examiner

*Primary Examiner* — Chi Q Nguyen

(57) ABSTRACT

A roofing clamp is arranged on a corresponding roof seam for receiving a Z-shaped clamp for attaching to the end of a solar collector and receiving a U-shaped clamp for attaching to the sides thereof for attaching the solar collector to the roof without insertion within said roof.

1 Claim, 5 Drawing Sheets

METHOD AND APPARATUS FOR ATTACHING A SOLAR PANEL TO A ROOF (Continuation-in-Part of U.S. patent application Ser. No. 12/590,321 filed Nov. 6, 2009 now abandoned).

BACKGROUND OF THE INVENTION

With the increasing costs of combustion fuels, solar energy collection has become an important source of heat and electric energy. Various arrangements for mounting solar collectors, such as solar panels are currently available.

Two such arrangements are described within U.S. Pat. No. 7,434,362 entitled "System for Removably and Adjustably Mounting a Device on a Surface" and U.S. Pat. No. 7,260,918 entitled "Apparatus and Method for Positioning a Module on an Object".

Both of the aforementioned Patents require one or more pair of track rails that are affixed to the roof surface and upon which the solar panels can be removably attached.

A further arrangement is described within U.S. Pat. No. 6,360,491 entitled "Roof Support for a Solar Panel". This arrangement describes a method for attachment, which requires drilling the mounting base to the roof rafter.

U.S. Pat. No. 7,758,011 entitled "Adjustable Mounting Assembly for Standing Seam Panels" describes an assembly for installing a solar module on a building that requires a stud utilizing a pair of nuts, one fixed on the stud and another movably arranged on the stud for attaching the solar module to a roof clamp.

It would be economically advantageous, and much simpler, to install the solar panels to the roof via a roof clamp without having to drill into the roof, without requiring the use of track rails or a pair of bolts arranged on a stud.

One purpose of the instant invention, accordingly, is to describe a simple and economically feasible arrangement for the attachment and removal of solar panels to a roof without insertion within the roof, per se.

SUMMARY OF THE INVENTION

A roofing clamp is arranged on a corresponding roof seam for receiving a Z-shaped clamp for attaching to the ends of solar collectors and receiving U-shaped clamps attaching the sides thereof. The Z-shaped and U-shaped clamps are threadingly engaged with the roofing clamps for convenient connection and removal therefrom without requiring insertion within the roof.

DESCRIPTION OF THE PREFERRED EMBODIMENT

Figure 1:
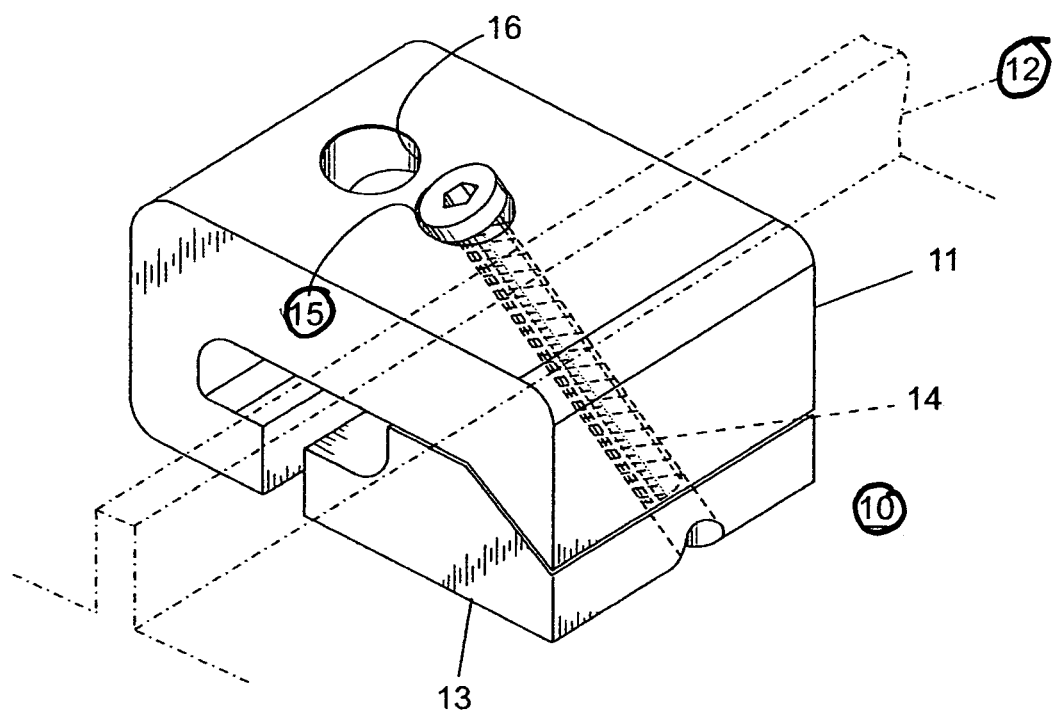
FIG. 1 is a top perspective view a roofing clamp attached to a roof eave in accordance with the Prior Art.

FIG. 1 depicts a roofing clamp 10, such as described within U.S. Pat. No. 7,386,922 entitled "Snow-Guard Clamping Unit", attached to a roof seam 12 by placement of the top piece 11 over the base piece 13 and inserting a first elongated screw 14 within the threaded opening 15 extending within the top and base pieces 11, 13.

Figure 2:
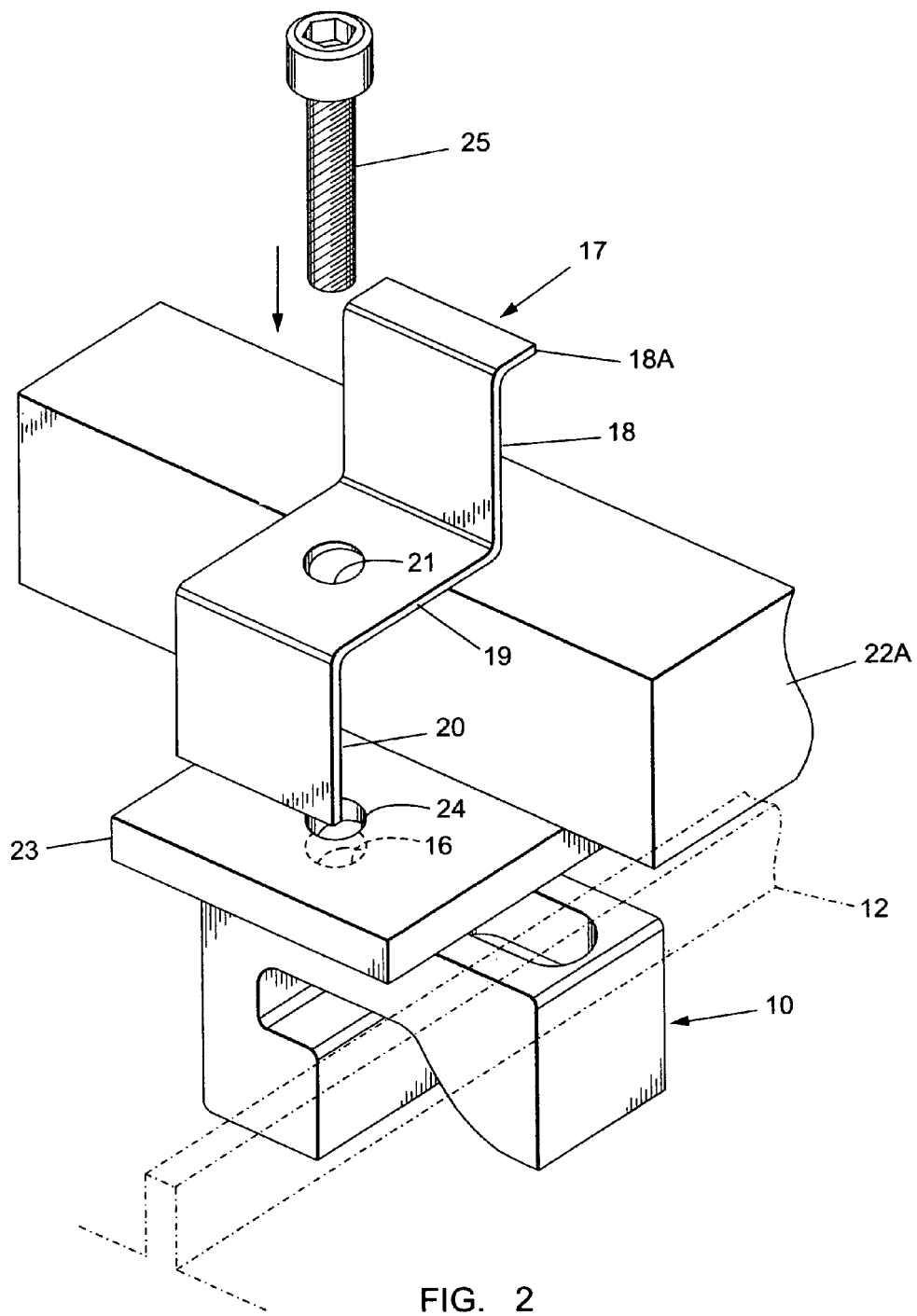
FIG. 2 is a top perspective view of the Z-shaped clamp of the invention prior to attaching an end of a solar panel to the roofing clamp of FIG. 1.

In accordance with the invention, a second threaded opening 16 extends within the top piece 11 for receiving a second elongated screw 25 as best seen by now referring to FIG. 2.

As shown in FIG. 2, the end 22A of a solar panel, such as that described within U.S. Pat. No. 5,232,518 entitled "Photovoltaic Roof System", is positioned on the roofing clamp 10, affixed to the roof seam 12 in the manner described earlier, and arranged such that the clearance opening 24 on the solar panel end plate 23 overlies the second threaded opening 16 on the roofing clamp 10.

A first means of attachment is a Z-shaped clamp 17 defining a vertical top 18 having a curved end 18A, horizontal center 19 and vertical bottom 20 is arranged such that the clearance opening 21 on the horizontal center 19 overlies the clearance opening 24 on the solar panel end plate 23 and the second threaded opening 16 on the roofing clamp 10.

Figure 3:
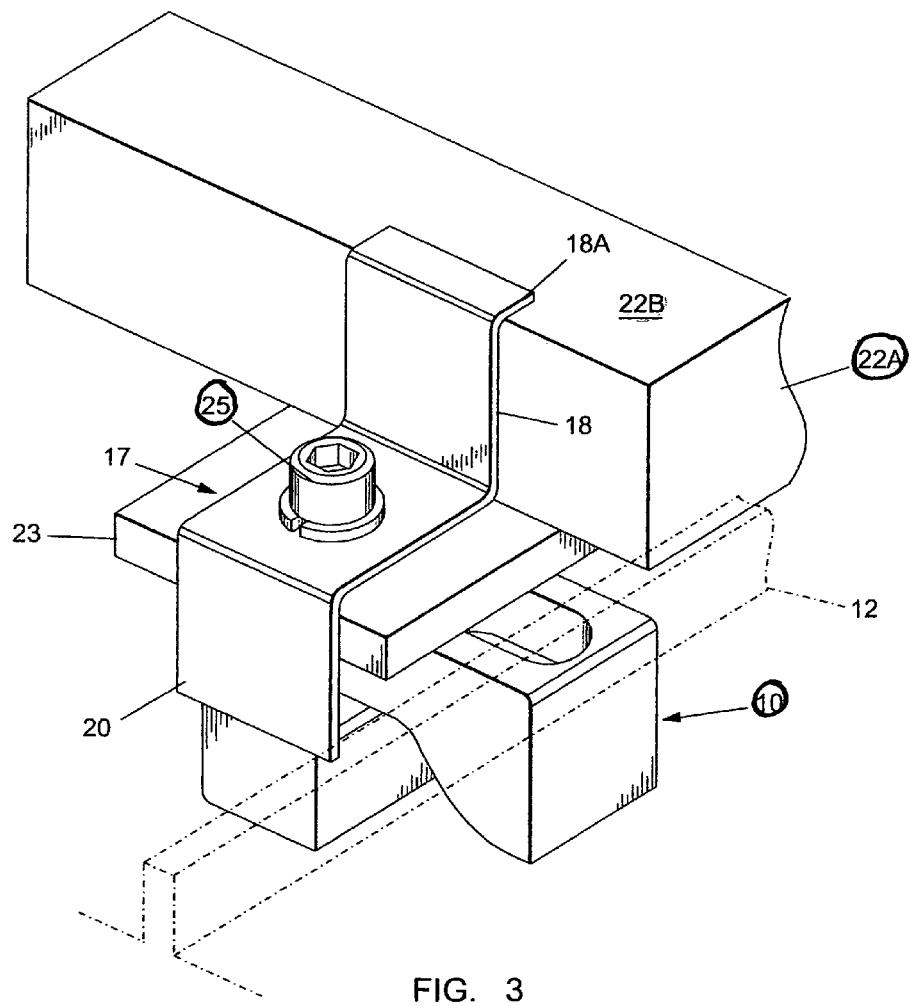
FIG. 3 is a front perspective view of the Z-shaped clamp of the invention attached intermediate the end of the solar panel and the roofing clamp of FIG. 2.

The second elongated screw 25 is inserted thru the clearance openings 21, 24 for threadingly engaging the second threaded opening 16 within the roofing clamp 10 to attach the solar panel end 22A to the roofing clamp 10 via the Z-shaped clamp 17 as shown in FIG. 3.

The solar panel end 22A is shown attached to the roof seam 12 via the roofing clamp 10 with the solar panel end plate 23 secured via the vertical bottom 20 and second elongated screw 25 and with the top surface 22B of the solar panel end 22A captured under curved end 18A of the vertical top 18.

To release the Z-shaped clamp 17 from the solar panel end 22A, the elongated screw 25 is loosened to allow clearance relation between the top surface 22B of the solar panel end 22A, without having to remove the Z-shaped clamp 17, per se.

Figure 4:
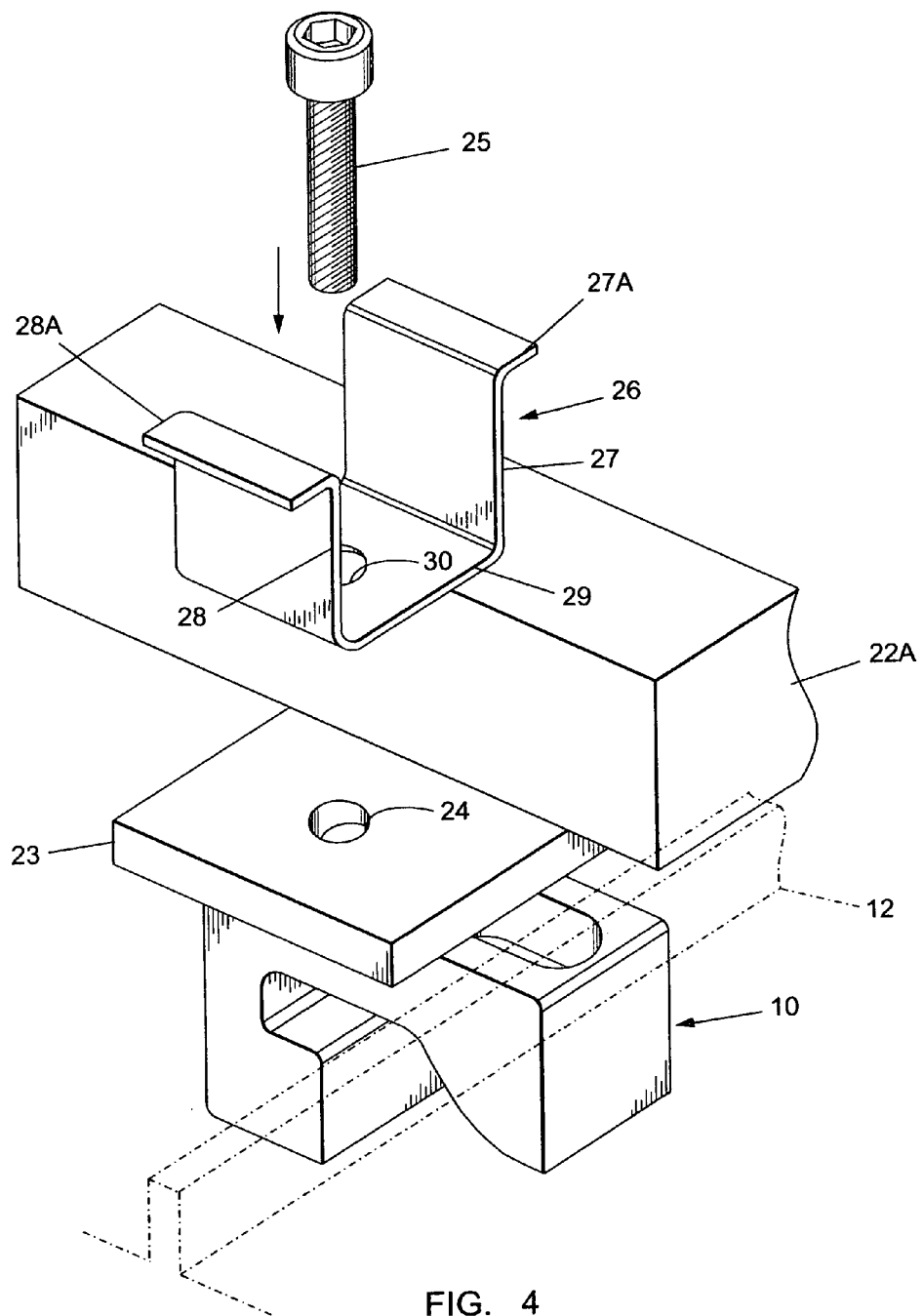
FIG. 4 is a top perspective view of the U-shaped clamp of the invention prior to attaching a side of a solar panel to the roofing clamp of FIG. 1.

A second means of attachment is a U-shaped clamp 26, as shown in FIG. 4 defining a pair of upstanding sides 27, 28 having outwardly curved ends 27A, 28A joined by a planar center piece 29 is arranged such that the clearance opening 30 on the center piece 29 overlies the clearance opening 24 on the solar panel end plate 23 on the end of the solar panel 22A and the second threaded opening 16 on the roofing clamp 10 (FIG. 2) affixed to the roof seam 12.

Figure 5:
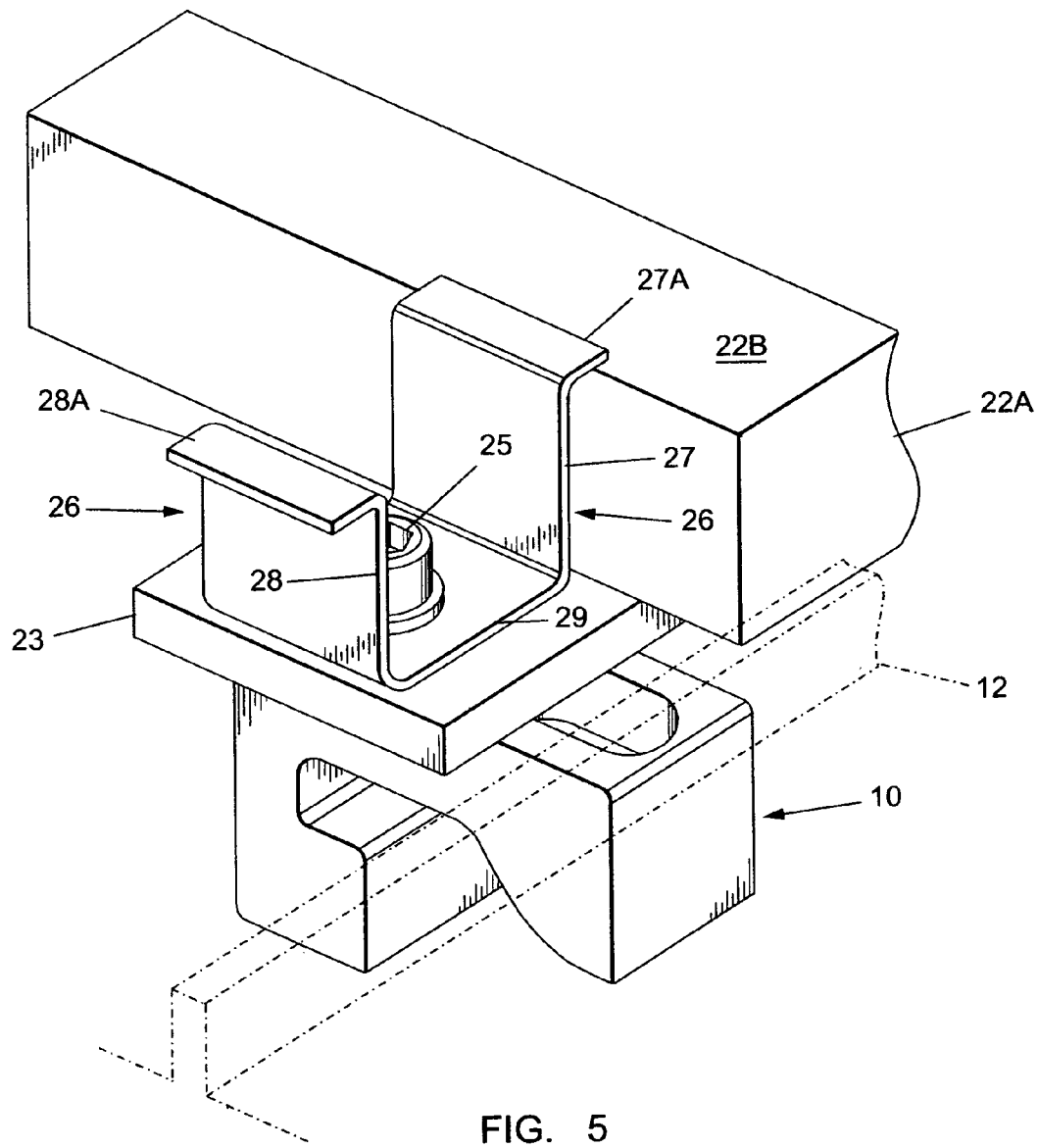
FIG. 5 is a front perspective view of the U-shaped clamp of the invention attached intermediate the side of the solar panel and the roofing clamp of FIG. 4.

A similar elongated screw 25 is inserted thru the clearance openings 30, 24 for threadingly engaging the second threaded opening 16 within the roofing clamp 10 to attach the solar panel end 22A to the roofing clamp as shown in FIG. 5.

The solar panel side piece 22A is shown attached to the roof seam 12 via the roofing clamp 10 with the solar panel end 23 secured via center piece 29 and elongated screw 25 and with the top surface 22B of the solar panel side piece 22A captured under curved end 27A of the side 27.

Although omitted for purposes of clarity, another sidepiece similar to that depicted at 22A is arranged with the top surface of the other solar panel side piece also captured under curved end 28A of the side 28.

To release the U-shaped clamp 26 from the solar panel side pieces 22A, the elongated screw 25 is loosened to allow clearance relation between the top surface 22B of the solar panel side piece 22A, without having to remove the U-shaped clamp 26, per se.

The use of releasable U-shaped and Z-shaped clamps is an important feature of the invention when the associated solar panels are to be attached for Summer usage, and later removed to allow connection with snow-guards for Winter usage as described within the aforementioned U.S. Pat. No. 7,386,922, with the U-shaped and Z-shaped clamps remaining in place throughout the Summer and Winter seasons.

What is claimed is:

1. A connection system removable attaching a solar panel to a roof without insertion within said roof comprising:

a two-piece roofing clamp arranged for removably attaching to a roof seam, a first piece of said two piece clamp includes a threaded aperture; and a second piece of said two piece clamp defines a Z-shaped connector including a clearance aperture, whereby a first threaded screw removably connects said first piece of said two-piece roofing clamp to said roof seam and a second threaded screw removably connects an end of a solar panel to said second piece Z-shaped connector of said roofing clamp via said Z-shaped connector clearance aperture, wherein said Z-shaped connector comprises a vertical top piece and a vertical bottom piece jointed by a planar center piece having said clearance aperture therein; and said vertical top piece include a curved end for capturing said end of said solar panel.

* * * * *